United States Patent [19]
Hill

[11] Patent Number: 5,834,875
[45] Date of Patent: Nov. 10, 1998

[54] MULTIPHASE ELECTRIC MACHINE WITH PREFABRICATED CONDUCTOR LANES

[76] Inventor: Wolfgang Hill, Ortenbergstrasse 3, 76135 Karlsruhe, Germany

[21] Appl. No.: 430,845

[22] Filed: Apr. 6, 1995

Related U.S. Application Data

[63] Continuation of PCT/EP93/02678, Sep. 30, 1993, now abandoned.

[30] Foreign Application Priority Data

Oct. 9, 1992 [DE] Germany .......................... 42 34 145.0

[51] Int. Cl.$^6$ ..................................................... H02K 1/22
[52] U.S. Cl. .......................... 310/268; 310/180; 310/260; 310/207
[58] Field of Search .................................... 310/268, 179, 310/180, 181, 260, 270, 206, 207; 29/598, 596

[56] References Cited

U.S. PATENT DOCUMENTS

| | | | |
|---|---|---|---|
| 2,469,808 | 5/1949 | Aske | 172/120 |
| 4,319,152 | 3/1982 | Van Gils | 310/201 |
| 4,398,112 | 8/1983 | Van Gils | 310/201 |
| 4,451,749 | 5/1984 | Kanayama et al. | 310/62 |
| 4,543,503 | 9/1985 | Kaminski et al. | 310/59 |
| 5,028,830 | 7/1991 | Mas | 310/211 |
| 5,616,977 | 4/1997 | Hill | 310/179 |

*Primary Examiner*—Steven L. Stephan
*Assistant Examiner*—Jonathan D. Link

[57] ABSTRACT

Known conductor lanes which can be set into the grooves of linear motors or disk armatures, do not sufficiently occupy the space available in the grooves and winding overhang in multiphase machines, and thus increase the volume and weight of the machines. For high power and force densities, the conductor lanes should allow the available space to be fully occupied. The number of the different conductor lane designs should be minimized in order to reduce production costs. According to the invention, the conductor lanes (13–16) which are prefabricated in a single piece are being led past each other in the overlapping zones in the direction of the groove depth, so that the conductor cross-section is variably adapted to the available space. By using pairs of conductor lanes (13, 14) without loops and mutually offset by one pole pitch in a groove, a high utilization of the space available in the winding overhangs and short conductor lengths are achieved. Symmetrical winding overhangs allow the conductor lanes to be easily mounted and removed at any time in direction of the depth of the groove. The number of different conductor lane designs is limited to twice the phase number thanks to the use of mirror symmetries. This winding is suitable for motors and generators in which a reduced overall height and a high power density are of advantage.

9 Claims, 5 Drawing Sheets

MULTIPHASE ELECTRIC MACHINE WITH PREFABRICATED CONDUCTOR LANES

This is a continuation of International application PCT/EP93/02678, with an international filing date of Sep. 30, 1993, now abandoned.

BACKGROUND OF THE INVENTION

1. Field of the Invention

The invention concerns a multiphase electric machine in which the rotor and the stator lie opposite to each other separated by a plane air gap, said rotor or stator possessing at least one soft magnetic body with continuous grooves which lie parallel to the gap surface plane, and having prefabricated insulated conductor lanes of a width that corresponds to the groove width arranged within said continuous grooves, said conductor lanes extending without bending radii across all pole pitches of the machine, and where within the winding overhangs which abut the faces of a soft magnetic body groove bars from adjacent pole pitches are connected by links.

2. Description of the Prior Art

U.S. Pat. No. 4,398,112 describes a layered conductor construction for disk armatures and linear motors wherein the conductor lanes are inserted into the grooves in the direction of the groove depth. The identical winding layers are of constant height which results in short lengths of the conductor lanes, however, in multiphase machines only a fraction of the space available in the grooves and winding overhangs is utilized. While the required conductor volume remains low, the iron volume increases with the increasing number of phases and volume and weight of the housing increase according to the dimensions of the machine.

With the number of overlapping phase conductors increases that part of the machine which actively contributes to generation of torque and, because of the low structural height, improves heat dissipation via a large surface to volume ratio.

The invention is, therefore, based on the objective to advance the development of a multiphase electric machine in which the rotor and the stator lie opposite to each other separated by a plane air gap in a manner that in multiple phases also a high utilization of space available in the grooves and winding overhangs, a large surface to volume ratio, and high power and force densities with low losses are achieved, as well as the separation of the winding into as few different parts as possible in order to enable cost effective production.

SUMMARY OF THE INVENTION

In accordance with the invention, total utilization of the space available in the grooves is achieved by arranging those parts of the inner conductor lanes which run as links within the winding overhangs in the direction of the groove width and which abut the soft magnetic body, in the direction of the groove depth below or above the height of the grooves, said arrangement resulting in the conductor lanes of different phases being led past each other at different distances to the gap surface plane. The links of the conductor lanes utilize thereby the space in front of the yoke in direction to the grooves and possess the same distance on both sides of the soft magnetic body to the face of said soft magnetic body. This allows the pushing together of conductor lanes of different phases in the direction to the groove depth so that their links are placed behind one another in direction of the grooves. Two conductor lanes of a respective phase are arranged offset to each other by one pole pitch and their conductor cross-section varies so that together they occupy the space of their plane of links evenly.

In the simplest design only the number of conductor lanes corresponding to the number of phases is required for an operative machine. For the uniform utilization of space in the area of the links the number of different conductor lane designs is twice that of the number of phases. When the winding is enlarged by mirror symmetric attachment of additional conductor lanes, they are always based on these smallest possible structural components which are also referred to as single-layer or double-layer winding units.

In permanent magnet machines two identical winding units are arranged in mirror symmetry to their common interface within a soft magnetic body which results in serial connection of four conductor lanes per phase and thereby makes possible high induced countervoltage, even at a low number of revolutions. Further, to increase the induced voltage, a second identically constructed soft magnetic body may be arranged on the back side of the rotor disk. Because of the double mirror symmetry, manufacturing costs are limited, although the driving power in relation to the design is quadrupled by merely one winding unit.

A further mirroring at a surface lying parallel to the gap surface plane results in a drive with two rotor disks, four soft magnetic bodies, and eight winding units which presents itself for active cooling between the inner soft magnetic bodies by means of a liquid or gaseous coolant.

As a matter of priority, however, for a high induced countervoltage, the conductor length in the energizing field should be increased by increasing the number of pole pairs. To avoid an increase in resistance at higher revolutions based on the unilateral current displacement, divided bars might now possibly be required.

In the description, the conductor lanes prefabricated as a single piece are verbally separated into constituent areas wherein the areas lying within the soft magnetic body are designated as groove bars and areas in the winding overhang which are running in the direction of the groove width are designated as links.

The surface of the grooved soft magnetic body which lies opposite its respective rotor or stator is understood as the gap surface plane.

The direction of the groove depth represents the normal of this surface, and the direction of the groove width together with the direction of the groove build a plane which lies parallel to the gap surface plane.

Further, the description is based on a brushless machine with its winding arranged in the stator. The invention is, of course, also applicable to commuted machines in which the winding rotates.

The drawings present advantageous embodiments of the invention.

DETAILED DESCRIPTION OF THE PREFERRED EMBODIMENT

Figure 1:
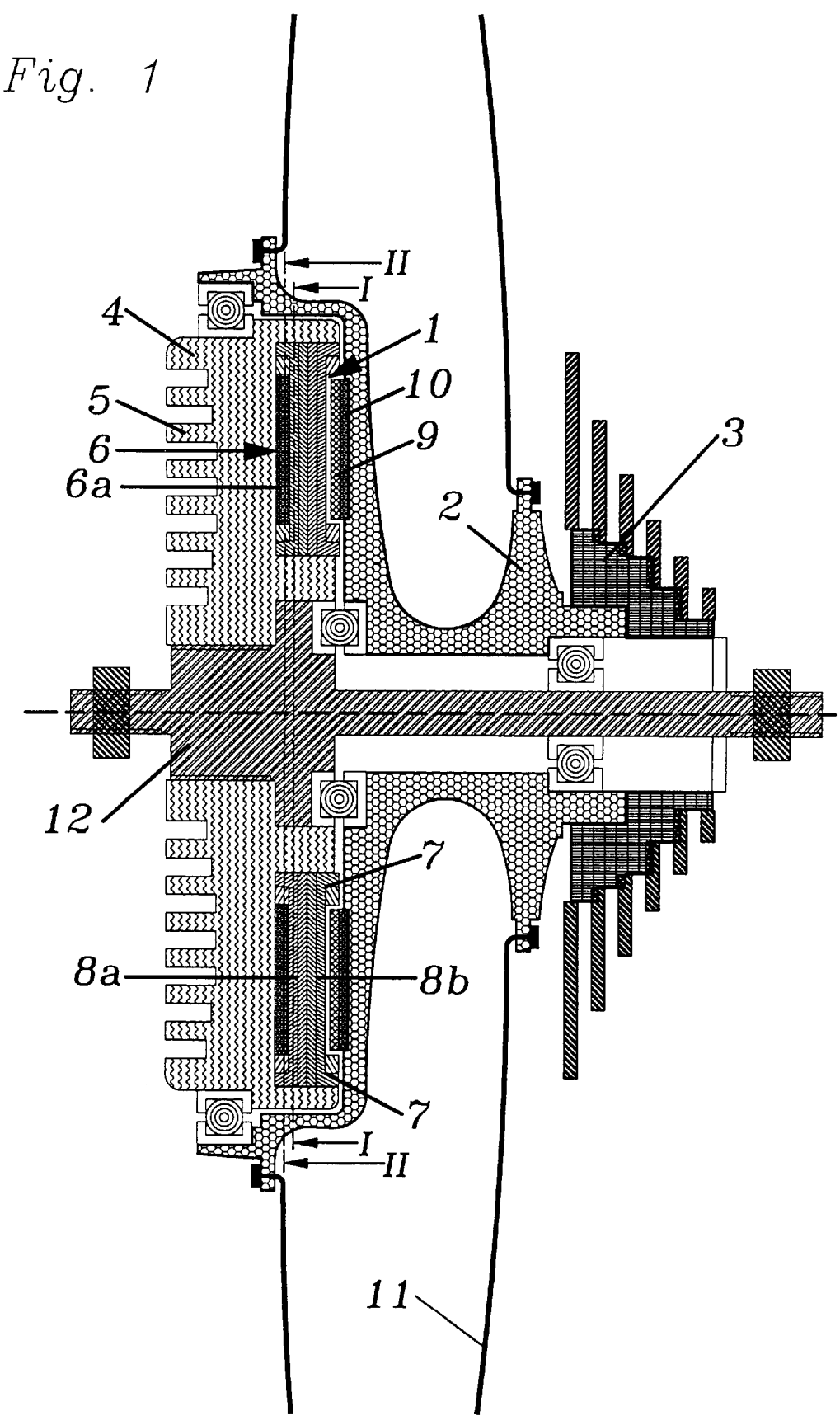
FIG. 1 shows the cross section of the direct drive of a bicycle.

FIG. 1 shows a cross section through the rear hub (2) of a bicycle in which a disk armature motor (1) has been installed opposite the sprocket wheel (3) of the derailleur. The cooling body (4) consisting of a material of light weight, high strength, and good heat conduction possesses on its outside cooling gills (5) and on its inside it encloses the yoke (6) and the two winding overhangs (7) on three sides, thereby ensuring good heat dissipation. Torque is generated by the currents in the two two-phase, two-layer winding units (8a, b) interacting with the strong energizing field of the permanent magnets (9). Both winding units are of identical design and consist of four conductor lanes each with two offset conductor lanes each sharing one plane of links. The magnets (9) are radially arranged within the links of the upper winding unit and are glued to the yoke of the rotor (10). As is usual in hubs with drum brakes, the spokes (11) are designed with different lengths. The dimensions of stator and rotor are characteristic for machines in accordance with the invention. However, the depiction of the shaft (12) and the sprocket wheel (3) was arbitrarily chosen.

Figure 2:
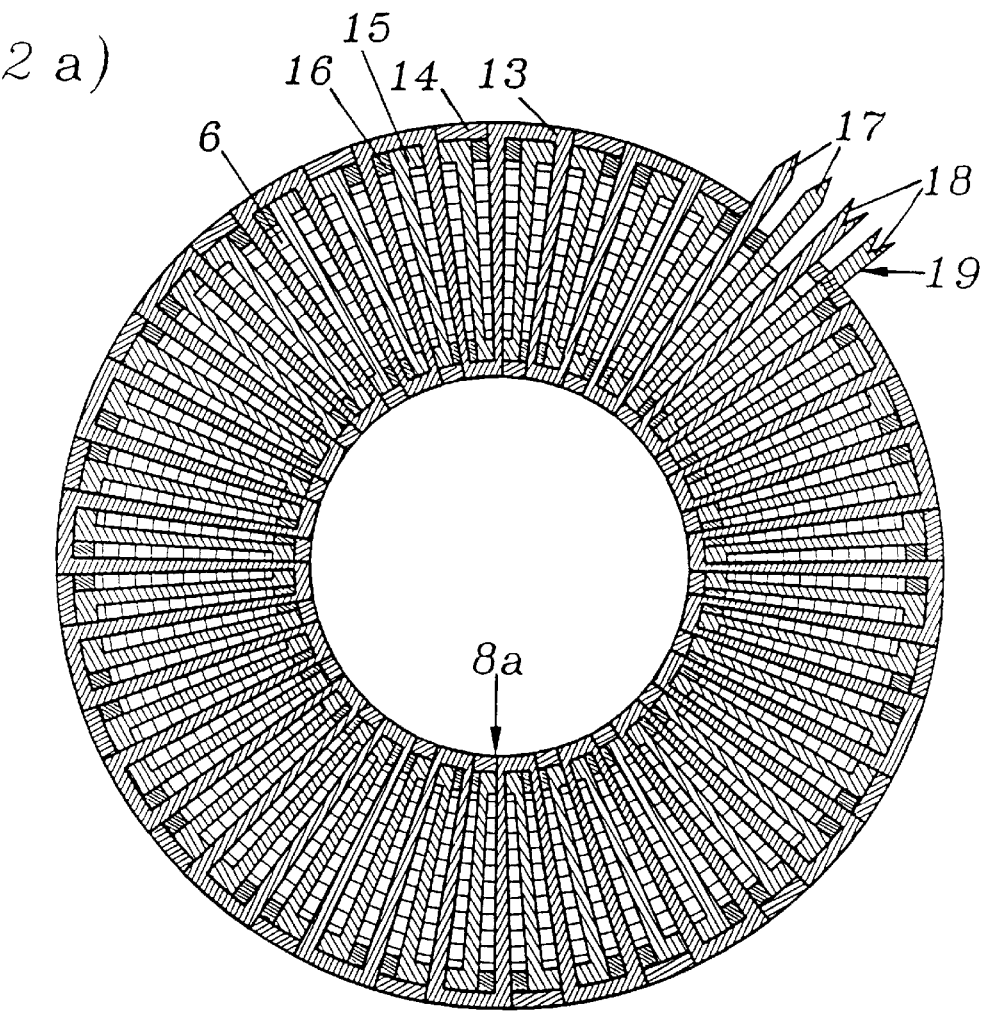
FIG. 2 shows the sections corresponding to lines I—I and II—II from FIG. 1 wherein a forty-pole, two-layer winding unit is depicted.
Figure 2:
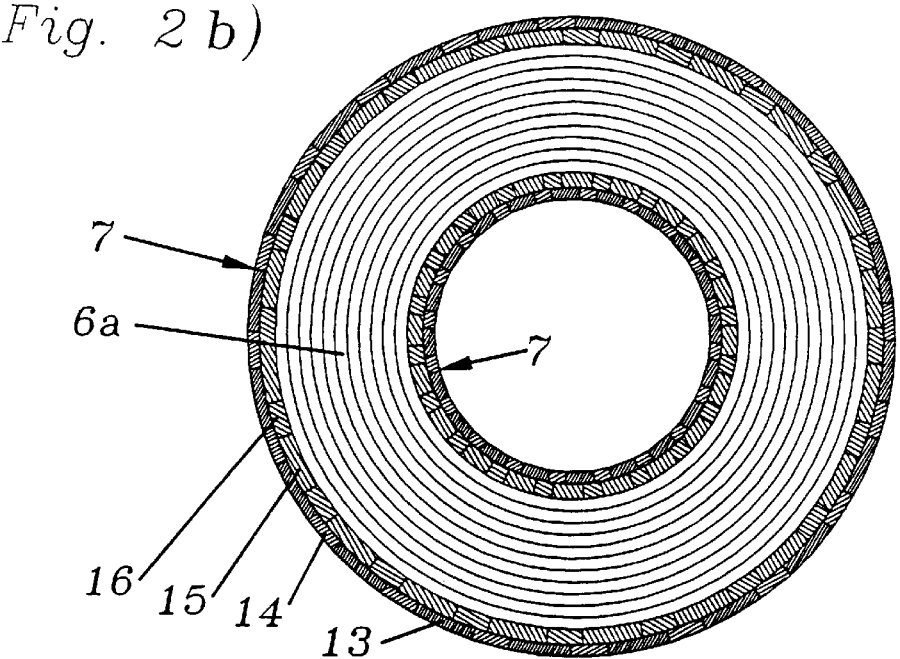

FIG. 2a shows a cut through the lower groove bar layer of the lower winding unit (8a) corresponding to line I—I from FIG. 1. A forty-pole winding with two grooves per pole pitch is depicted. The four conductor lanes which together form a winding unit are indicated by (13), (14), (15), and (16). Besides the concentric hatching symbolizing the teeth of the soft magnetic body (6), the conductor lanes are indicated by differentiated hatching. The outer conductor lane (13) of the lower groove bar layer is completely visible, while the inner conductor lane (15) of this groove bar layer lies at the intersections beneath the bottom of the grooves and appears, therefore, to be interrupted by the outer conductor lane (13). The conductor lanes (14) and (16) of the upper groove bar layer of the same winding unit are visible only in the two winding overhangs (7). Concurrently, the outer upper conductor lane (14) utilizes, in the outer plane of links, the gaps of the outer lower conductor lane (13) by occupying there the entire axial height of the winding unit (8a). Of the inner upper conductor lane (16) which together with (15) forms the two inner planes of links, only the axially arranged sections in the space of the teeth are visible. A conductor lane (19) encircles the entire circumference of the machine except for a gap where current supply (17) or current derivation (18) for the drive or the transition to another adjacent conductor lane in the direction to the groove depth occurs.

The progression of the conductor lanes is further clarified in FIG. 2b in which the cut corresponding to line II—II from FIG. 1 through the soft magnetic body and the area of the links beneath the bottom of the grooves is depicted, wherefore only the links of the conductor lanes are visible.

Figure 3:
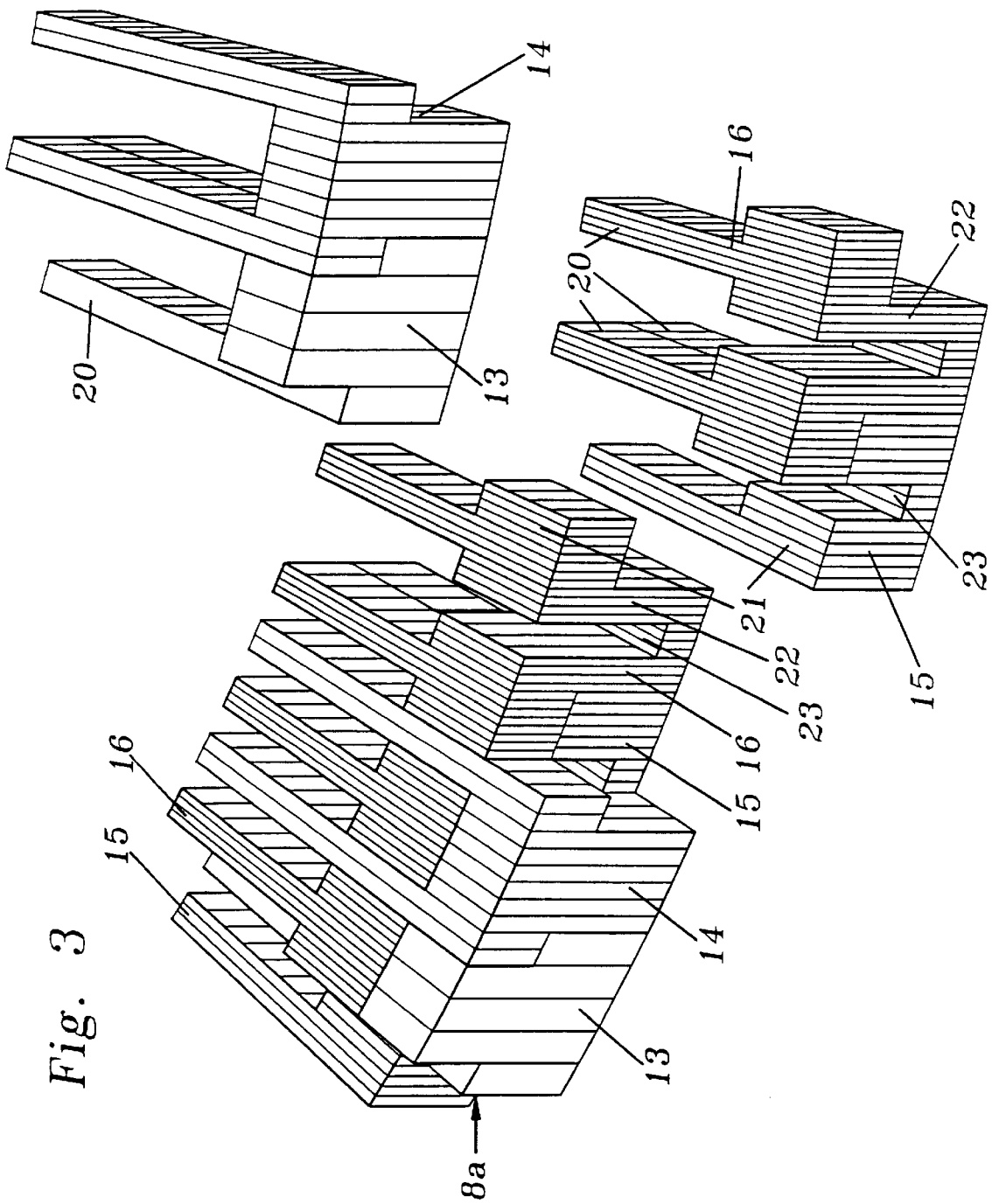
FIG. 3 shows a section of the four conductor lanes from FIG. 2.

FIG. 3 shows a section of the four conductor lanes (13) to (16) of the two-phase, two-layer winding unit (8a) in which, however, all conductor lanes begin and terminate fictitiously in the middle of the groove. The four conductor lanes are hatched in different densities. Although the conductor lanes consist in reality of one piece and are axially movable only as a whole, one connection each in the winding overhang is depicted in an axially offset arrangement in the right half of the figure in order to make the characteristic design visible. For this purpose the two outer conductor lanes (13) and (14) are also eliminated from the middle pole pitch. The two outer conductor lanes abut each other tangentially and form together a solid, disk-shaped structural component which can be axially inserted into the structural component consisting of the two inner conductor lanes (15), (16). Adjacent to the axial sections (22) of the upper inner conductor lane (16), the space of the teeth is utilized for the tangential enlargement of the conductor cross section at the ends of the groove bars (21) which enlarges the surface of transition of the lower inner conductor lane (15) from the tangential narrow groove bar (20) to the axial narrow link (23).

Figure 4:
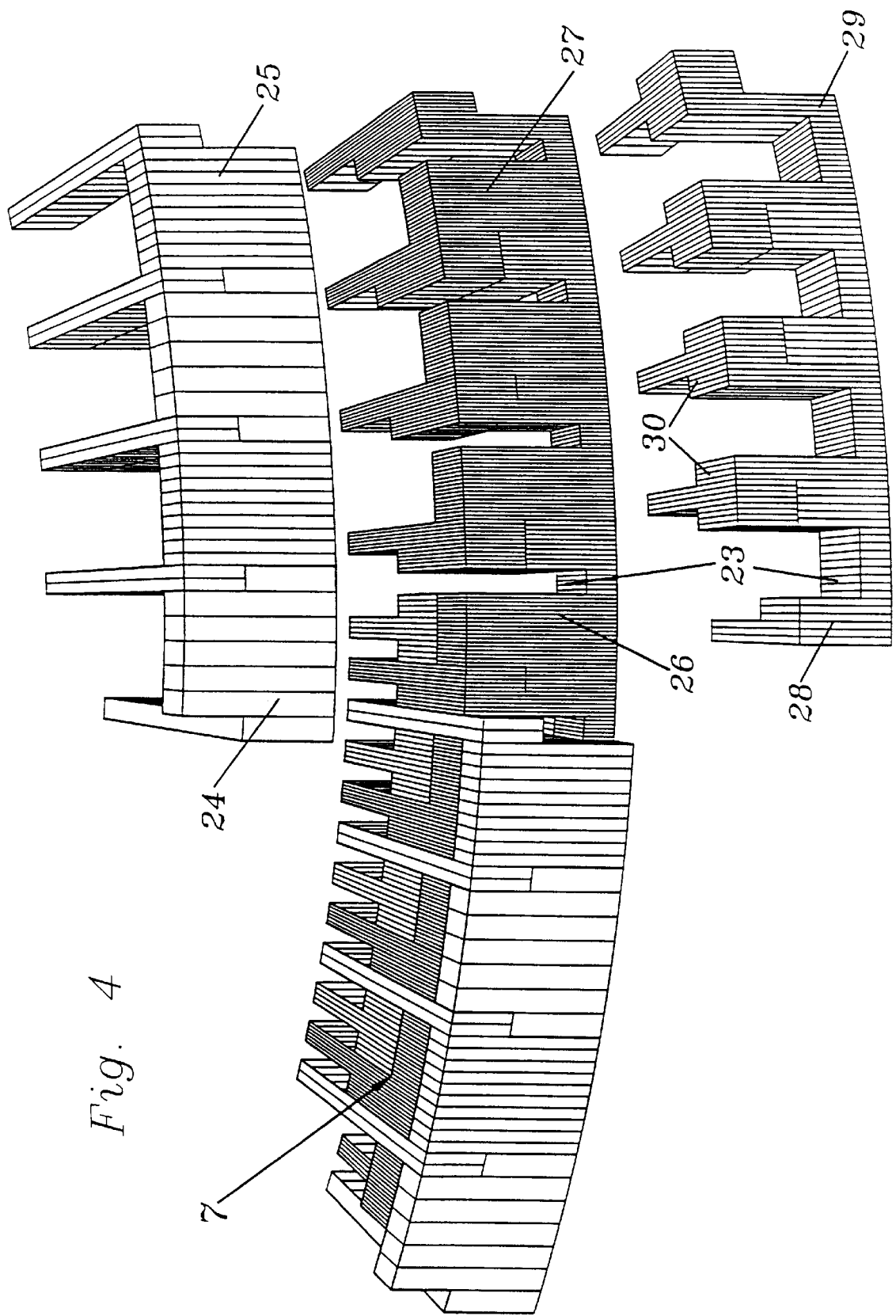
FIG. 4 shows a section of the six conductor lanes of a three-phase, two-layer winding unit.

FIG. 4 shows a section of the six conductor lanes (24 through 29) of a three-phase, two-layer winding unit, said section comprising eight pole pitches in which, similar to FIG. 3, only one winding overhang (7) is depicted. While on the left half of the drawing, the compact structural design of the axially pushed together conductor lanes is depicted, the right half of the drawing shows the outer (24, 25) and inner conductor lanes (28, 29) fictitiously shifted upward and downward in axial direction. Again, a simple pushing together of the conductor lanes in direction to the groove depth is possible, by first inserting the inner conductor lanes (28, 29) with their links (23) recessed in direction to the groove depth. The abutting of the conductor lanes ensures a solid, self-supporting construction of the winding and the space of the winding overhang is completely utilized by the radial extension of the enlargements of the conductor cross section (30) of the middle conductor lanes (26, 27).

Figure 5:
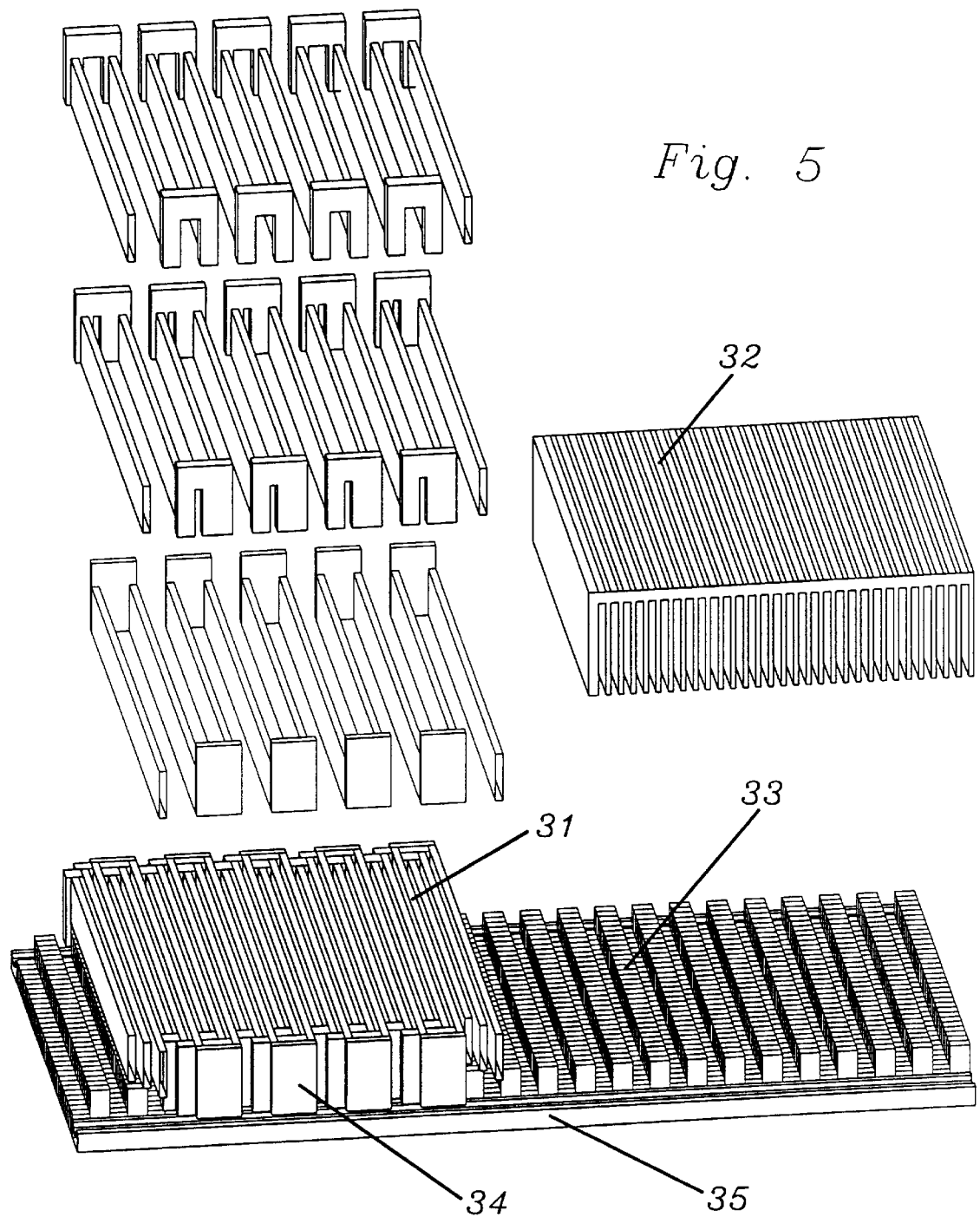
FIG. 5 shows a linear motor operator in accordance with the reluctance principle.

Besides in its embodiment as disk armature, the conductor design can also be advantageously applied in linear motors. In FIG. 5 a linear motor in accordance with the reluctance principle is shown which distinguishes itself, besides by its flat design, in particular by is relatively high reaction rate. The three-phase conductor design which consists of two single-layer winding units (31) is here arranged in the armature (32) which slides like a sled across the stator (33). The solid winding overhangs (34) constitute the support for the two deep groove bearings (35) which allows to keep the mass of the stator to a minimum.

I claim:

1. A multiphase electric machine in which the rotor and the stator lie opposite to each other separated by a plane air gap, said rotor or stator possessing at least one soft magnetic body (6) with continuous grooves which lie parallel to the gap surface plane, and having prefabricated conductor lanes (13 through 16) of a width that correspond to the groove width arranged within said continuous grooves, said conductor lanes extending without bending radii across all pole pitches of the machine, and where within the winding overhangs (7) which abut the faces of a soft magnetic body groove bars (20) from adjacent pole pitches are connected by links (23),wherein the conductor lanes in the winding overhangs are of different cross sections in longitudinal direction with the result that the links (21) of an inner conductor lane (15, 16, 28, 29) which abut directly the soft magnetic body (6) leave space in direction to the groove depth for conductor lanes (13, 14, 24 through 27) from other grooves of the same pole pitch and thereby utilize the area in the winding overhang (7) which lies in front of the yoke of the soft magnetic body (6a) in direction to the grooves.

2. A multiphase electric machine as recited in claim 1 wherein the links of conductor lanes (13, 15) which in the soft magnetic body (6) have the same distance from the gap surface plane are in the winding overhang (7) sequentially arranged in the direction to the grooves, and the links (21) of a conductor lane (15) have on both sides of a soft magnetic body (6) the same distance to the faces of said soft magnetic body.

3. A multiphase electric machine as recited in claim 1 wherein the conductor cross section of a conductor lane is enlarged in direction to the groove width in sections (21) which in the winding overhangs run in direction to the groove depth as compared to sections (20) which lie in the soft magnetic body.

4. A multiphase electric machine as recited in claim 1 wherein conductor lanes (24 through 29) possess rectangular cross sections and conductor lanes (24, 26, 28) of different phases abut in the winding overhangs, separated only by thin insulating layers.

5. A multiphase electric machine as recited in claim 1 wherein the links (23) of two conductor lanes (15, 16) which abut in the soft magnetic body (6) in direction to the groove depth are in the winding overhang (7) arranged in alternating sequence in direction to the groove width.

6. A multiphase electric machine as recited in claim 1 wherein the conductor lanes in the sections (20) which lie in the soft magnetic body (6) are separated by insulating layers into parallel placed current paths in direction to the groove depth.

7. A multiphase electric machine as recited in claim 1 wherein in a soft magnetic body four conductor lanes per groove are arranged in an abutting manner, such that the respective links (23) of two conductor lanes (15, 16) have the same distance to the gap surface plane and to the face of the soft magnetic body, and in which that half (8*a*) of all conductor lanes which lie closer to the gap surface plane are identical to the other half (8*b*) of the conductor construction.

8. A multiphase electric machine as recited in claim 1 wherein to identical grooved soft magnetic bodies (6) are arranged on opposite sides of the rotor or stator and wherein the number of different conductor lane designs in the entire machine corresponds to twice the number of phases.

9. A multiphase electric machine with prefabricated conductor lanes as recited in claim 8 wherein a second identically designed structural component consisting of a rotor and two soft magnetic bodies (6) with prefabricated conductor lanes (13–16) is arranged in an offset manner in direction to the groove depth and wherein a coolant circulates between the two inner soft magnetic bodies (6).

* * * * *